Nov. 10, 1964  G. A. SHEWMAKE ETAL  3,155,992
LIFE RAFT
Filed Sept. 5, 1962  2 Sheets-Sheet 1

INVENTORS
Glenn A. Shewmake
Matthew I. Radnofsky

BY

ATTORNEYS

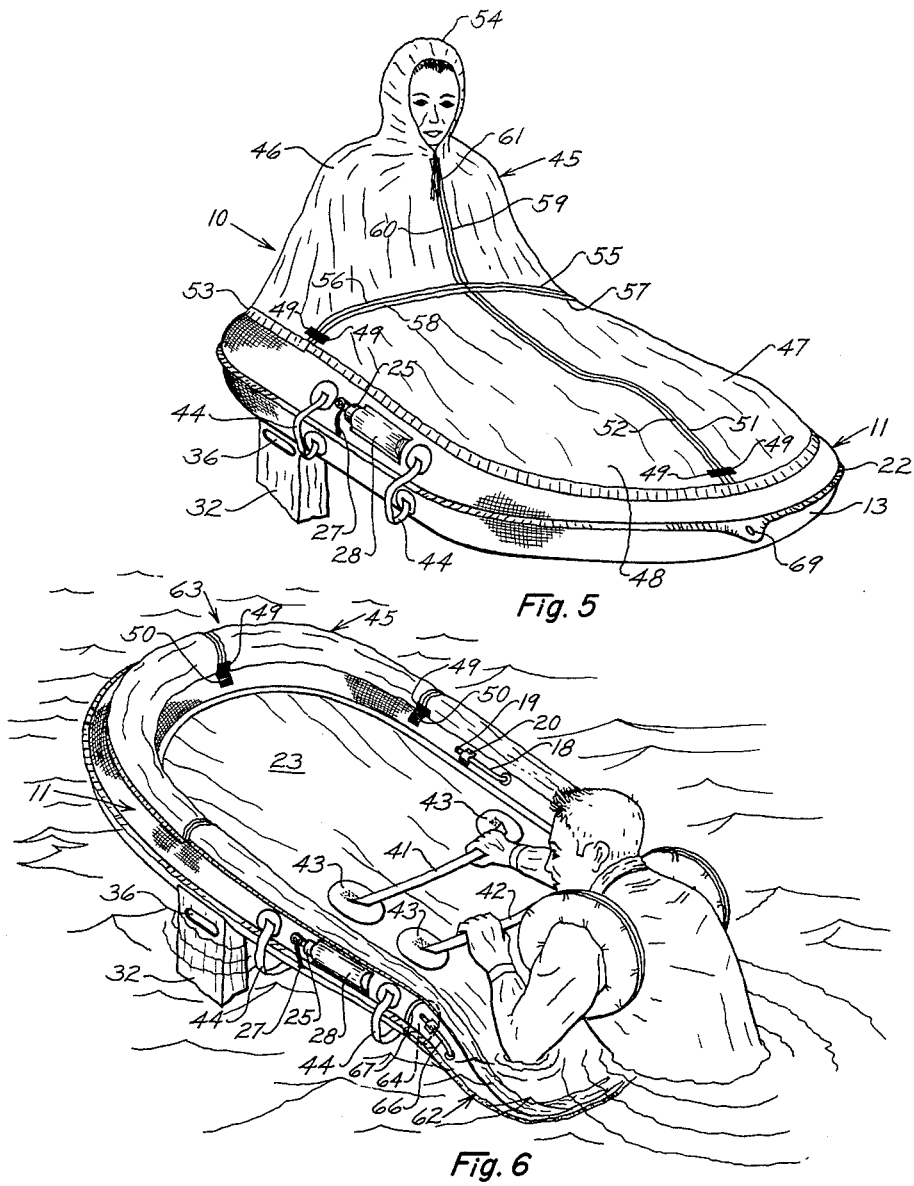

United States Patent Office 3,155,992
Patented Nov. 10, 1964

3,155,992
LIFE RAFT
Glenn A. Shewmake and Matthew I. Radnofsky, Houston, Tex., assignors to the United States of America as represented by the Administrator of the National Aeronautics and Space Administration
Filed Sept. 5, 1962, Ser. No. 221,634
8 Claims. (Cl. 9—11)
(Granted under Title 35, U.S. Code (1952), sec. 266)

The invention described herein may be manufactured and used by the Government of the United States of America for governmental purposes without the payment of any royalties thereon or therefor.

This invention relates generally to boats, and more particularly to an inflatable life raft.

In the designing of spacecraft for carrying man to the reaches of space, important restrictions are necessarily imposed on the weight and size of the vehicle components and the equipment to be carried therein, including the items of survival equipment which are provided for the safety and welfare of the space traveler. Therefore, a life raft to be carried as survival equipment for space flights should desirably possess a lightweight construction and the adaptability to being reduced to a small and packageable size. Other characteristics of like importance and desirability are stability in rough seas, facility in boarding, and in addition thereto, a demonstrated high degree of radar reflectivity for increasing its susceptibility to detection by the search radars of rescue parties in the event the space traveler has come down in the water and found it necessary to take to the raft.

All of these characteristics, of course, are desirable to greater or lesser degree in rafts to be carried as survival equipment in aircraft. However, the type of rafts which have heretofore been used as life rafts are generally of a heavier, more complex construction and greater bulk than is desired for use as survival equipment in space vehicles. Without the provision of elaborate and weighty appendages these prior art rafts do not exhibit the degree of radar reflectivity which is adequate for quick detection by the search radars of rescue planes and vessels, particularly when the space traveler has come down at a location far removed from an expected landing area. Furthermore, boarding of these rafts from the water, particularly by a swimmer such as an astronaut clothed in a cumbersome and heavy pressure suit, has proved to be unduly difficult. On the other hand, the lighter rafts of the prior art, which are of desirable weight, lack stability and ruggedness of the degree required of life rafts, and in general do not possess many of the other characteristics desirable for life rafts which are to be carried in space flights.

To overcome these attendant disadvantages in the rafts of the prior art, the raft of this invention is constructed of a lightweight fabric with a minimum of seams for accomplishing reduction in weight and for simplicity of manufacture. It is designed to provide stability by the nature of its configuration and is provided with fabric ballast buckets on its underside which increases its stability in rough seas. It is provided with boarding handles across its floor and in one modified form incorporates a separately inflatable section as an additional aid in boarding from the water. It is also provided with a radar-reflective covering which is stored in a reefed condition on the raft but which may be unreefed and drawn up about an occupant in the raft for shielding him from sun and spray and at the same time enhancing the radar-reflectivity of the raft.

An object of this invention is to provide a new and improved boat of simple and economical construction.

Another object is to provide an inflatable life raft which, when deflated, is reducible to a small and packageable size.

Still another object of the invention is to provide a life raft which is fabricated of lightweight materials and which demonstrates a high degree of stability.

A further object is to provide an inflatable life raft which may be easily boarded by a person in the water even though the person be clothed in heavy garments, such as a pressure suit or the like.

A still further object is to provide an inflatable life raft having a configuration whereby a partial vacuum chamber tends to be created beneath the raft as the raft is uplifted from the water, thereby contributing to its stability.

Yet another object is to provide an inflatable life raft which incorporates means for increasing the radar-reflectivity of the raft to increase its susceptibility to detection by the radars of search craft and for shielding an occupant in the raft from sun and spray without the provision of elaborate and weighty appendages to the raft.

Other objects and many of the attendant advantages of this invention will be readily appreciated as the same become better understood by reference to the following detailed description when considered in connection with the accompanying drawings in which like reference numerals designate like parts throughout the figures thereof and wherein:

FIGURE 5 is a perspective view of the inflated life raft shown in FIGURE 1 showing a person seated in the raft with a radar-reflective covering pulled up and secured about him; and FIGURE 6 is a perspective view of a modified form of the raft, showing a person boarding the raft over a deflated section which is separately inflatable.

Figure 1:
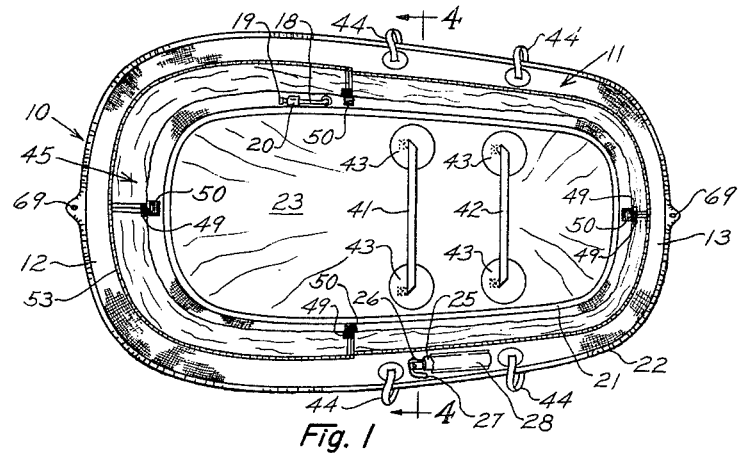
FIGURE 1 is a top plan view of an inflatable life raft in the inflated state which represents one embodiment of the invention.
Figure 2:
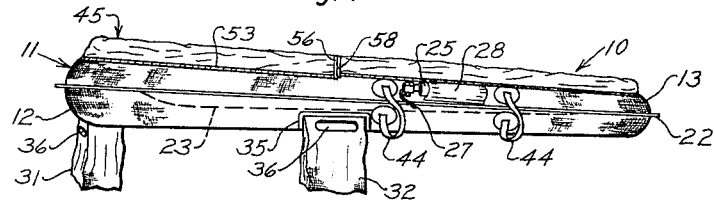
FIGURE 2 is a side elevation of the inflated raft of FIGURE 1.

Referring more particularly to the drawings, there is shown in FIGURES 1 to 5 a raft 10 which is a preferred embodiment of the invention. The raft 10 comprises an inflatable flotation tube 11 configured in the form of a closed oval loop with a forward end 12 and an aft end 13. The inflatable portion 11 is substantially circular in cross section when inflated and like other principal parts of the raft is fabricated of nylon fabric which has been coated on one side with neoprene. This type of fabric, in addition to demonstrating substantial durability, provides for a very lightweight construction of the raft.

The inflated tube at the forward end 12 of the raft is designed with a greater diameter than at the aft end 13 of the raft, with the diameter decreasing uniformly towards the aft end. As an example, in one model of the raft which has been constructed, the tube diameter tapers from 12 inches at the forward end to 6 inches at the aft end with an overall length of raft of approximately 5 feet, 6 inches. Such tapering configuration of the flotation tube provides greater stability for supporting a person in seated position on a raft of small size. For obtaining the optimum weight distribution, the tapering configuration of the flotation tube makes it preferable for an occupant of the raft when seated to sit in the bow and face aft.

Figure 4:
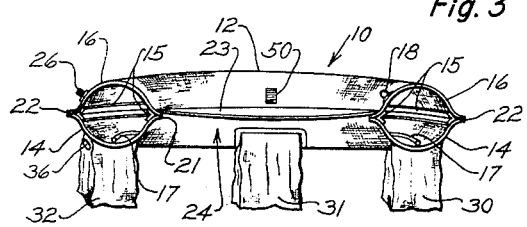
FIGURE 4 is a sectional view of the raft as taken along the line 4—4 in FIGURE 1 and looking in the direction of the arrows, with a gas cylinder for inflating the raft and a radar-reflective covering having been removed from the raft.

For the purposes of weight saving and to provide for a simple and inexpensive method of manufacture it is preferable that the inflatable tube portion of the raft be fabricated with as few seams as possible. One acceptable procedure is to generate a design pattern of the inflatable tube portion as a projection on a single plane and to outline the pattern on the neoprene-coated side of a sheet of nylon fabric, such as the sheet 14 shown in section in FIGURE 4. The width of the tube in the pattern and outline, however, must necessarily be enlarged to provide for the desired tube diameter when inflated, and may be calculated in accordance with the following formula:

$$\text{Pattern diameter} = \frac{\text{tube diameter} \times \pi}{2k}$$

where $k$ represents the stretch modulus of the material. The outline markings in the form of concentric loops are then covered with coats of neoprene cement over an area of two or more inches on both sides of each loop. A conventional bias tape 15, as seen in FIGURE 4, is then applied to each oval outline on the fabric by folding each tape lengthwise so that the tape is V-shape in cross section and applying the folded edge of the tape to the outline with its open edges internal to the oval design of the tube. A solution of talc, or the like, of cream-like consistency is then brushed over the area encompassed between the tapes so that when a second sheet 16 of neoprene-coated nylon, which has also been coated with adhesive, is applied to the first sheet so as to cover the outline thereon, it will adhere only in those areas external to the talc-coated area encompassed between the tapes, thus providing for an air-tight tubular assembly.

The provision of "V-tapes" at the cemented junctures or seams of the fabric results in the transfer of mechanical "peel" forces to forces acting in shear along the seams when the tube is inflated, thus producing stronger seams since the "shear" strength of a cemented "V-tape" greatly exceeds the "peel" strength, as would be the limiting factor of a seam without a "V-tape."

If desired, before the cover fabric is applied, a light cord 17 of nylon, or the like, may be cemented to the first sheet of fabric within the talc-coated area between the loops of tape. The presence of the cord serves to insure provision of an air passage between the sheets when the tubular portion of the raft is being evacuated of air as is customary for tight packing of the raft into a compact storage container, such as a survival equipment kit, to be carried aboard spacecraft or aircraft.

Following the application of the cover sheet 16 of the underlying sheet 14, an oral inflation manifold 18, preferably of the type disclosed in U.S. Patent No. 2,502,301, is then affixed to the inflatable unit in conventional manner such as by cementing the annular rubber flange, which is provided at the connecting end of the manifold, about an aperture which has been appropriately formed in the tube fabric. A one-way valve 19 installed in the free end of this manifold permits the passage of air through the manifold into the inflatable tube but effectively checks it exit therefrom. A nylon strap 20 cemented to the inflatable tube 11 provides means for holding down the free end of the manifold in place against the flotation tube.

After the inflation manifold 18 has been installed, the unit is then inflated slightly through this part and following an adequate cure time the pressure in the tube is adjusted to the point where the folded "V-tapes" are separated from their inner faces and the inner surfaces of the tube do not touch. To complete its fabrication, the inflatable unit is allowed additional time for curing.

With the two nylon sheets thus joined together, the area of fabric which is interior to the inner seam of the inflatable tube cannot be satisfactorily used as the floor of the raft since it proves to be insufficiently elastic to permit adequate inflation without causing extreme twisting and distortion of the tube. For this reason this area of the joined fabrics is unsuitable and must be removed. Hence, the fabrics are trimmed to about 1¼ inches from the junction which forms the inner seam of the inflatable tube and to within about ½ inch from the juncture which forms the outer seam of the inflatable tube, thus providing for an inner seam flange 21 and an outer seam flange 22.

The floor or deck 23 of the raft, which may also be neoprene-coated nylon fabric, is cemented about its peripheral edge to the inner flange 21 of the inflatable tube. The section of fabric which forms the floor is cut to conform generally to the shape of the part which was removed from the interior of the inflatable unit but in area, however, is designed to be slightly in excess of the area of the removed fabric, thus permitting its being cemented about its peripheral edge to the inner flange 21 in a manner such that it is not held taut but hangs therefrom in a slightly relaxed condition. Hence, the deck, although relaxed, is in a slightly raised position relative to the bottom of the raft. Therefore, when one climbs aboard the inflated raft, the relaxed floor permits the lowering of the center of gravity and, in addition, causes the forcing out of some of the air which has been trapped beneath the floor of the raft. Consequently, a partial vacuum tends to form in the chamber 24 beneath the raft whenever the raft tends to be uplifted from the water. This resulting partial vacuum enhances the stability of the raft by acting to oppose forces tending to capsize the raft.

For rapid inflation of the raft, a charged carbon dioxide cylinder 25 is provided which is attached to an inlet check valve 26 on the flotation tube, as best shown in FIGURE 4. The inlet check valve 26 is provided to insure against the carbon dioxide escaping from the tube and may be of a type manufactured by the Walter Kidde Corporation, Part No. 800507. This valve is installed in conventional manner in an aperture appropriately formed in the wall of the tube. The carbon dioxide cylinder is desirably of light weight and may be of the type manufactured by the Bendix Corporation, Part No. EV-156-A1. This type of cylinder is a stainless steel cylinder provided with an internally threaded fitting which is adapted to connect to an externally threaded fitting of the check valve. Discharge of the cylinder is accomplished by pulling a lanyard 27. For holding the cylinder in place, particularly during storage of the raft, a nylon bag 28 is cemented to the upper surface of the flotation tube near the check valve 26 in a position to receive and support the cylinder therein. If desired, after the cylinder has been discharged and the raft inflated, the cylinder may be unscrewed from its connection with the check valve and discarded.

The installation of the oral inflation manifold 18 in addition to providing an additional means for inflating the tube 11 permits replenishment of pressure in the flotation tube by orally inflating the tube in the event of leakage of the carbon dioxide through the inlet valve or its gradual diffusion or leakage through the fabric walls of the tube. In this manner, a person in the raft may maintain an adequate internal pressure of the tube at all times.

Figure 3:
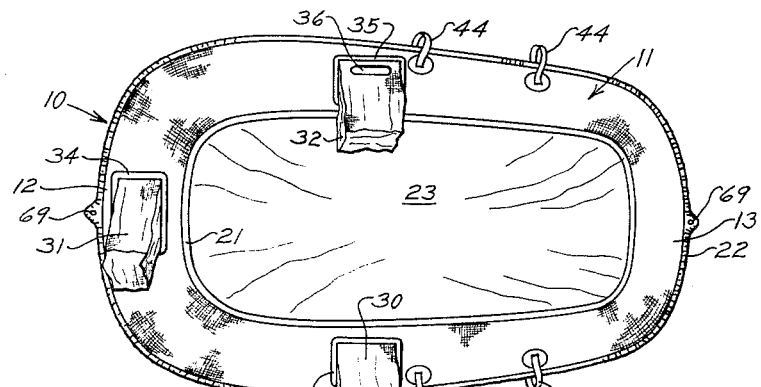
FIGURE 3 is a bottom view of the inflated raft of FIGURE 1.

Ballast containers 30, 31, and 32 of fabric construction are attached to the underside of the raft to function as stabilizing elements. These containers are in the form of buckets which depend from the underside of the raft and, like the other principal parts of the raft, are preferably fabricated of neoprene-coated nylon. The top edge of each bucket is sewed to a nylon flange, such as the flanges 33, 34, and 35, respectively, as best shown in FIGURE 3, which flange is then cemented flat against the underside of the flotation tube. For simplicity in construction, the buckets are rectangular in cross-section and the fabric flanges from which they are suspended are correspondingly of rectangular design. When the inflated raft is disposed in water, each of the buckets fills with water through a slot 36 which is formed in the wall of each bucket near the top thereof. It was found that for best stability, one of the stabilizing buckets should be located at the forward end of the raft with two buckets located at opposite sides amidships whereby the two side buckets provide sidewise stability and the bucket at the forward end tends to hold the bow in the water when the raft is boarded from the aft end. Although a limited amount of stability is provided by the partially evacuated chamber beneath the floor of the raft, the ballast buckets prove the more effective for stabilizing the raft in heavy seas.

For aid in boarding, a pair of boarding aid handles 41 and 42 in the form of nylon strips, each approximately 1 inch in width and 12 inches in length, are installed on the floor of the raft. The ends of each strip are sewed to separate nylon reinforcement patches 43 which are cemented to the floor of the raft with the handles extending in a direction transversely to the raft and spaced approximately a foot apart. As best seen in FIGURE 6, these handles are located sufficiently near the aft end of the raft where they may be grasped easily by a person in the act of boarding from the aft end.

Side straps 44, similar in construction to the boarding handles, are attached in similar manner to the flotation tube 11 at the sides of the raft. These straps are provided for enabling a swimmer in the water to grab hold of the raft more easily.

A flexible protective covering 45 for the raft is provided, which is of laminated nylon-Mylar fabric coated on one side with a vapor deposit of aluminum. While other flexible laminates comprising radar-reflective material might be used for the covering, a composition of this type provides for a very lightweight but tough and durable fabric which cannot be easily torn. When not in use, the covering is kept tightly furled on the tube 11 throughout the length of the tube where it is stored in a relatively out-of-the-way location, but where it is readily accessible and adaptable to being drawn up about an occupant of the raft for protecting him against sun and spray and the caprices of the elements, while at the same time increasing the radar reflectivity of the raft and its susceptibility to detection by the radars of search parties. In addition, it serves the further purpose of keeping water out of the raft.

As attached to the raft, the covering is preferably arranged with its aluminum coating disposed towards the inside of the raft for the purpose of reducing glare. It is also of a thickness which will not transmit more than .1 percent of visible light as the minimum requirement for insuring a radar reflectivity characteristic which is adequate for obtaining a detectable radar echo. A covering as described may be fabricated which will weigh approximately only 1 ounce per square yard.

As best shown in FIGURE 5, the covering 45 is comprised of a shoulder cape section 46 and leg-covering sections 47 and 48, each of which is cemented along one edge to the upper surface of the inflatable tube such that the covering is attached throughout the length of the tube to completely encompass the deck area of the raft. Each section of the covering is provided with at least one patch 49 of Velcro tape which, when the section is in reefed condition, is adapted to engage and interlock with a corresponding patch 50 of Velcro tape cemented on the tube 11 just above the floor of the raft. Velcro tape is a product of the Velcro Corporation, of New York, N.Y., and is fabricated in two forms, one of which, the male type, is in the form of nylon fabric with numerous tiny nylon hooks and is adapted to interlock with the female type, also of nylon fabric which is provided on one side with numerous nylon loops.

The hooks and loops of the cooperating patches of tape interlock merely by pressing one patch against the other with a light pressure, but to separate the patches a considerably stronger force must be exerted, particularly when a "shear" force is exerted in a sidewise direction. Thus, when a patch 49 is pressed against a patch 50, the two are adapted to interlock so that the sections of the covering may be secured in an out-of-the-way reefed position on the tube. The location and number of these Velcro patches are arbitrary, of course, so long as the patches which are intended to interlock are of opposite types and enough are provided to securely hold each of the sections of the covering in the reefed condition.

In addition, each of the sections of the covering is formed with free edges provided with strips of Velcro throughout their length for interlocking with cooperating tapes provided along free edges of the adjacent sections whereby the sections may be unreefed and secured on to another by placing their cooperating taped edges in overlapping engagement. More particularly, the leg covering section 47 is provided along one free edge with a Velcro strip 51 for interlocking with a Velcro strip 52 of opposite type which is secured along one free edge of the section 48 whereby these parts may be drawn up and secured over the legs of an occupant in the raft when he is seated in the bow of the raft facing aft as illustrated in FIGURE 5. The configuration and number of the leg-covering sections is not critical, of course, but they should comprise a sufficient area so that when secured together they will completely cover the legs of a person when seated in the raft facing aft.

The cape section 46 of the covering, which is adapted to be drawn up over the head and shoulders, is cemented to the tube 11 along an edge 53 which extends from a point located approximately amidship on one side of the raft around the bow to a point approximately amidships on the other side of the raft. In design, this section is much like a cape or poncho having a hood 54 which is designed to fit over the head. When the cape section is drawn up over the shoulders, the lower free edges of the cape extend inboard at the midships section of the raft and are securable by Velcro tapes 55 and 56 to the free edges of the leg covering sections which also extend inboard amidships of the raft and are similarly provided with Velcro tapes 57 and 58 of opposite type to the tapes 55 and 56, respectively, for interlocking therewith. The front of the cape is also designed with free edges which extend from the neck of the hood to the free edges at the bottom of the cape and are provided with cooperating interlocking Velcro strips 59 and 60 for closing the cape in front of the person. A drawstring 61 fitted into the cape at the front of the hood permits drawing up the hood tightly over the head and against the face so that only the face of a person seated in the raft is exposed.

It will thus be apparent that the covering 45 may be drawn up and secured about a person in the raft with only a minimum of effort and in the short time required to fasten the cooperating strips of Velcro to one another. It will also be seen that when the covering is arranged and secured in the manner illustrated in FIGURE 5, the occupant of the raft will be effectively shielded from sun, wind, and spray and there will be little chance of water accumulating over the floor of the raft. Furthermore, by provision of the aluminum layer in the covering, the radar reflectivity of the raft is considerably enhanced when the covering is drawn up about an occupant of the raft and thus is raised above the low silhouette of the raft, so that the susceptibility of the raft to detection by radar of search parties is increased accordingly. This, as described, is accomplished without the provision of elaborate, complex appendages and support means for the covering which would necessarily add to the weight and complexity of the raft. When there is no need of the covering, of course, it may easily be retracted by separating the various Velcro connections of the covering sections and furling the sections for storage against the inflatable tube.

To further simplify the problem of boarding, the construction of the raft heretofore described may be modified by providing a separately inflatable section 62 of the flotation tube, preferably at the aft end of the raft as is shown in the raft 63 in FIGURE 6 wherein the parts corresponding to those in the raft of FIGURES 1 to 5 are similarly numbered. The provision of separate sections may be accomplished by providing separate bulkheads 64 in the opposite sides of the flotation tube near to and equidistant from the after end of the raft and further providing this after section with an oral inflation manifold 66 similar to the manifold 18. Thus, when the forward section of the raft is inflated by discharging the carbon dioxide cylinder the aft section may be left deflated. This deflated section provides a boarding ramp which enables a person in the water to more easily board the raft by grasping one or more of the boarding handles across the floor of the raft and pulling himself over the inclined ramp onto the floor of the raft. Since the floor of the raft will be easily forced downward below the level of the water to increase the inclination of the deflated section as the broader applies his weight thereto, a boarder will experience little difficulty in pulling himself up onto the raft, even though he may be attired in heavy clothing such as a pressure suit, or the like. Boarding in this manner also militates against the danger of capsizing as is present to a greater degree when the raft is boarded by climbing over the inflated flotation tube. After boarding, the occupant may then inflate the deflated section through the oral inflation manifold 66.

It will be readily apparent that in addition to the facility in boarding which is provided by the separately inflatable section of the raft, it provides for a boarding ramp which is an integral part of the raft itself with only a very small increase in the bulk of the raft and without the necessity for any rigid members.

In fabricating the raft with separately inflatable sections, the tubular portions of these sections may be individually fabricated as in the manner described for the fabrication of the tube 11 in the raft of FIGURES 1 to 5. The separate tubes are then joinable together by sewing and the use of fabric reinforcing strips, such as the strip 67 shown in FIG. 6. Although expedient, this method of fabricating is not to be considered limiting or exclusive since other methods of fabrication might be satisfactorily employed.

In addition to the features which have been described herein, the rafts of FIGS. 1 and 6 may, of course, be provided with other and various accouterments, if desired. For example, it is generally desirable that metal grommets such as the grommets 69 be provided in the outer seam flange of the inflatable tube and located preferably at the bow and stern of the raft, to which securing lines, anchor lines, or the like may be attached. The outer seam flange at these locations is preferably enlarged to receive the grommets.

The cement used for bonding the various parts of the raft should be a good waterproofing cement particularly adapted to the bonding of neoprene to nylon and neoprene to neoprene. An adhesive which serves satisfactorily for these purposes is a mixture of two neoprene adhesives, N136A and N136B, which are manufactured by the UBS Chemical Company, Cambridge, Massachusetts. Substitutions, of course, may also be made for the various materials disclosed herein provided they are of comparable weight, durability, and utility. Dacron, for example, might satisfactorily be used as a substitute for nylon. However, a raft incorporating materials of the type disclosed herein and fabricated in the manner described has been constructed with a length of approximately 5 feet, 6 inches, and an over-all weight not exceeding 5 pounds, including the weight of the charged $CO_2$ cylinder. It is also reducible when deflated, to a small compact package of less than 300 cubic inches in volume.

It will therefore be seen that a new and improved life raft of both simple and economical construction is disclosed herein which possesses a very lightweight fabric construction exhibiting unusual stability and ease of boarding when inflated and the adaptability to being reduced to a small size for compact packaging and storage. It will further be seen that the raft is provided with a lightweight, retractable covering of unelaborate form which in addition to providing means for increasing the radar reflectivity of the raft serves to shield an occupant of the raft from sun, wind, spray and the caprices of the weather. These features particularly adapt the raft for use as survival equipment with spacecraft and aircraft, and also make it desirable for use in many other fields and applications where rafts are employed.

It should be understood, of course, that the foregoing disclosure relates only to preferred embodiments of the invention and that it is intended to cover all changes and modifications of the examples in the invention herein chosen for the purposes of the disclosure, which do not constitute departures from the spirit and scope of the invention.

What is claimed and desired to be secured by Letters Patent is:

1. A life raft comprising a perimetrically disposed inflatable structure which when inflated is configured in the form of a tubular gunwhale enclosing a deck space for said raft, a deck member disposed within said deck space and attached to said inflatable structure, a plurality of water-ballast containers attached to the underside of said inflatable structure, each of which is provided with a port whereby said containers are adapted to fill with water when the raft in the inflated state is disposed in a body of water to thereby provide stability for said raft, a retractable covering for said raft of an area and configuration sufficient to cover said deck space and a person when seated therein, said covering being comprised of flexible, highly radar-reflective sheet material secured in engagement with the surface of said inflatable structure and adapted to be drawn up about a person in the raft to completely cover said deck space and to shield the person from sun and spray, and all of the aforesaid elements of said raft being comprised of pliable foldable materials whereby said raft is adaptable to being reduced to a small and compact size.

2. A life raft comprising a perimetrically disposed buoyant structure configured in the form of a loop which encloses a deck space and provides buoyancy for said raft, a deck member disposed within said deck space and attached to said buoyant structure, and a covering for said raft of an area and configuration sufficient to completely cover said deck space and a person when seated therein, said covering being in the form of a plurality of separate sections of pliable, foldable sheet material, said separate sections each having highly radar-reflective properties and being secured in engagement with said buoyant structure in juxtaposition to one another whereby said sections are adapted to be drawn up about a person in the raft to completely cover said deck space to thereby serve as a radar reflector for the raft and to shield said person from sun and spray while preventing the accumulation of water over the deck member of the raft.

3. A life raft comprising a flotation tube in the form of a perimetrically disposed inflatable structure which encloses an occupant-receiving space, a deck member disposed within said occupant-receiving space and attached to said inflatable structure, a radar-reflective covering for said raft in the form of a pliable sheet of highly radar reflective material, said covering consisting of a plurality of separate sections of said highly radar-reflective material each of which is secured along the surface of said inflatable structure in a manner such that the attachment of said radar-reflective sheet sections to said inflatable structure extends coextensively therewith to enclose said occupant receiving space, and one of said separate sections being in the form of a highly radar-reflective cape having a lower edge attached in engagement with the surface of said inflatable structure throughout the length thereof whereby said cape is adapted to be drawn up about the shoulders of an occupant seated in the raft, said separate sections each having free edges which are engageable with free edges of the next adjacent section and each said section comprising a sufficient area whereby the sections when disposed with their free edges in engagement will completely cover said occupant-receiving space, and cooperable fastening means for interlocking said sections when said sections are disposed with their engageable free edges in engagement whereby a person in the raft may draw up the sections of the covering about him and secure one to the other for shielding himself from sun and spray and to completely cover said deck member and thereby prevent accumulation of water over the deck member of the raft.

4. A life raft comprising an inflatable flotation tube of substantially circular cross-section and configured in the form of an elongated loop with the ends of said loop respectively forming the bow and stern of said raft and the diameter of said tube decreasing uniformly from the bow of the raft to the stern, a deck member disposed within the elongated loop defined by said tube and attached thereto, and a plurality of water-ballast containers suspended from said inflatable flotation tube, said containers being each provided with a port whereby said containers are adapted to fill with water when the raft is disposed in a body of water to thereby provide stability for said raft, and a retractable covering for said raft of pliable foldable highly radar reflective sheet material, said covering being attached in engagement with said inflatable flotation tube throughout the length thereof and having an area and configuration sufficient to cover said deck member and a person when seated thereon, whereby said covering is adaptable to being drawn up about a person in the raft to cover said deck member and said person and serve as a radar reflector for said raft.

5. A raft comprising an inflatable flotation tube configured in the form of a loop when inflated, a deck member disposed within said loop and attached to said flotation tube, said tube being comprised of separately inflatable sections, means on said raft for providing a boarding ramp, said means comprising one of said sections which in the deflated state declines below the surface of the water and provides a ramp for boarding the raft from the water when the other of said sections is inflated, boarding handles on said deck member positioned to be easily reached by a person in the water for boarding the raft over said deflated section, a plurality of water-ballast containers attached to the underside of said flotation tube, each of which is provided with a port whereby said containers are adapted to fill with water when the raft in the inflated state is disposed in a body of water to thereby provide stability for said raft, and a retractable covering for said raft, said covering being comprised of flexible, highly radar-reflective sheet material secured in engagement with the surface of said flotation tube and adapted to being drawn up about a person in the raft for shielding said person from sun and spray and to serve as a radar reflector for said raft.

6. A life raft comprising: an inflatable structure which when inflated is in the form of a tubular gunwale surrounding an occupant-receiving space; a deck member disposed within said occupant-receiving space and attached to said inflatable structure; a covering for said raft in the form of a plurality of separate sections of pliable sheet material, each of said separate sections including a layer of highly radar-reflective material and being secured in engagement with the surface of said inflatable structure in a manner such that the attachment of said sections to said inflatable structure extends coextensively therewith to enclose said occupant-receiving space, each said separate section having free edges which are engageable with free edges of the next adjacent section and comprising a sufficient area whereby the sections when disposed with their free edges in engagement will completely cover said occupant-receiving space and a person when seated therein to thereby shield the person from sun and spray and prevent accumulation of water over the deck member of the raft.

7. In combination with a life raft comprising an inflatable flotation tube which when inflated is in the form of a tubular gunwale enclosing an occupant-receiving space; a retractable covering for said raft of foldable, highly radar-reflective material, said covering being secured along its periphery in sealing engagement with the surface of said inflatable flotation tube and adaptable to being drawn up about a person in the raft to envelop said person and thereby shield said person from sun and spray and to serve as a radar reflector for said raft.

8. A raft comprising: an inflatable flotation tube configured in the form of a loop when inflated; a deck member disposed within said loop and attached to said flotation tube; means on said raft for providing a boarding ramp extending beneath the surface of the water to facilitate boarding from the water, said means comprising a separately inflatable section of the flotation tube which in the deflated state declines below the surface of the water when the other of said sections is inflated; and a retractable covering for said raft, said covering being comprised of flexible highly radar-reflective sheet material secured in engagement with the surface of said flotation tube and adapted to being drawn up about a person in the raft for shielding said person from sun and spray and to serve as a radar-reflector for said raft.

References Cited in the file of this patent

UNITED STATES PATENTS

| 3,019,457 | Lowery | Feb. 6, 1962 |

FOREIGN PATENTS

| 698,149 | Great Britain | Oct. 7, 1953 |
| 788,338 | Great Britain | Dec. 23, 1957 |
| 789,334 | Great Britain | Jan. 22, 1958 |
| 1,146,076 | France | Nov. 6, 1957 |